April 2, 1968  HIROYUKI TOMIOKA  3,376,060

METALLIC MEMBER AND JOINT ASSEMBLY

Filed Dec. 3, 1965

INVENTOR:
HIROYUKI TOMIOKA
BY
Kurt Kelman
AGENT

United States Patent Office 3,376,060
Patented Apr. 2, 1968

3,376,060
METALLIC MEMBER AND JOINT ASSEMBLY
Hiroyuki Tomioka, Amagasaki-shi, Japan, assignor to
Shinko Wire Co., Ltd., Amagasaki-shi, Japan
Filed Dec. 3, 1965, Ser. No. 511,483
Claims priority, application Japan, Dec. 14, 1964,
39/70,562
6 Claims. (Cl. 287—108)

ABSTRACT OF THE DISCLOSURE

A joint for connecting the ends of two wires or rods in which the ends are inserted in a sleeve, and wire coils are radially interposed between the ends and the sleeve. The coils are wound from wire of triangular cross section which is twisted about its axis prior to winding so that spaced narrow edge portions of the wire define the coil surface. The sleeves are compressed after assembly with the wire ends and the coils so that the edge portions of the coil wires bite into the joined wire ends and the sleeve to lock them to each other.

Background of the invention

The present invention relates to metallic joints between ends of two wires or two rods of relatively small diameter, and particularly to an improvement in joints for elongated metallic members in which a sleeve covers the ends, and locking elements are abuttingly interposed between the metallic members and the sleeve.

The locking elements of known joints are of relatively complex shape so that the joints are produced at relatively high cost. Moreover, some of the known joints lack adequate rigidity.

Summary of the invention

The invention overcomes the shortcomings of the known joints by providing locking elements which are substantially helical coils consisting of wire having a non-circular cross section so as to have narrow longitudinal edges which each extend substantially in a helix about the wire axis. The outer face of the coil is defined by spaced portions of the edges which engage at least one of the ends to be joined and the sleeve.

In preparing the joint, a wire of non-circular cross-section is twisted about its longitudinal axis, and the twisted wire is wound into coils whose inner diameter is slightly greater than the outer diameter of the wire or rod ends which are to be joined. A coil is slipped over each end, and the ends carrying the coils are placed in a sleeve whose inner diameter is slightly greater than the outer diameter of the coils while its length is sufficient to cover both coils. The sleeve is then deformed by pressure until the edge portions of the coils which define the inner and outer diameters of the coils penetrate into the sleeve and into the wire ends.

Other objects and features of this invention and the atendant advantages thereof will become apparent to those skilled in the art from the following detailed description of a preferred embodiment when considered in conjunction with the accompanying drawing.

Referring initially to FIGS. 1, 2, 5 and 6, the components of a joint of the invention are the two wires or metal bars 1 whose ends are to be connected, two helical locking coils 2, and a sleeve 3. In the disassembled condition shown in FIGS. 1 and 2, the coils 2 have an internal diameter slightly greater than the external diameter of the wires 1, and an external diameter slightly smaller than the internal diameter of the sleeve 3. The axial length of the sleeve 3 is slightly greater than the combined length of the two coils 2.

The coils are formed from a wire of triangular cross section which is twisted about its longitudinal axis prior to coil winding so that the outer face of each coil is formed by spaced, narrow edge portions of the wire alternating with broad face portions, the external diameter of the coil being determined by the edge portions which radially project beyond the face portions. If the twist of the wire in a coil is left-handed, the helix of the coil is preferably right handed, and vice versa.

Figure 1:
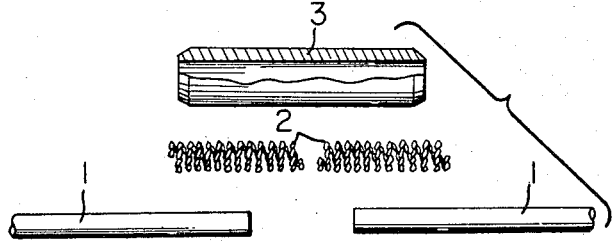
FIG. 1 shows the separate components of a joint of the invention in plan view, and partly in section.
Figure 2:
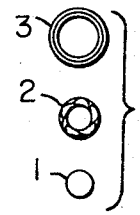
FIG. 2 illustrates the components of FIG. 1 in elevational end view.
Figure 3:
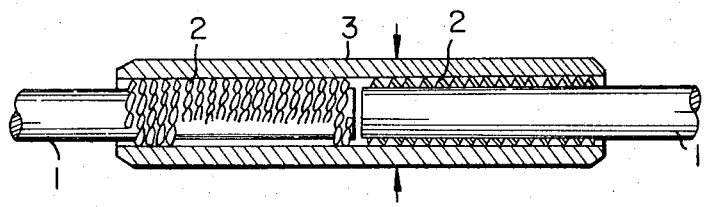
FIG. 3 shows the partly assembled components in sectional plan view on a scale larger than that of FIGS. 1 and 2.

In pre-assembling the joint, a coil 2 is slipped over the free end of each wire 1, and the two wires carrying the coils are placed end to end in the sleeve 3, as shown in FIG. 3, so that the innermost turns of the coils 2 are closely adjacent each other, and the outermost turns are still within the sleeve.

Figure 4:
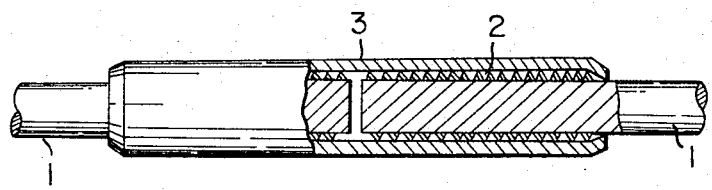
FIG. 4 illustrates the fully assembled joint in a view similar to that of FIG. 3.
Figure 5:
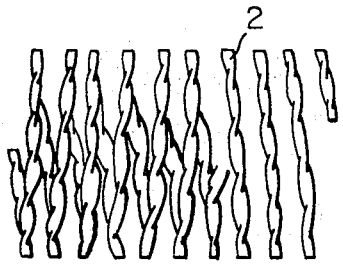
FIG. 5 shows an axially tensioned coil component of FIG. 1 in fragmentary plan view on a scale greater than that of FIGS. 3 and 4.
Figure 6:
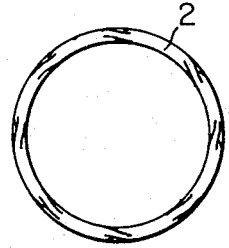
FIG. 6 is a front elevational end view of the coil component of FIG. 5.

The pre-assembled joint is then passed between rolls to compress the sleeve 3 axially as well as radially. The ultimate shape of the joint is shown in FIG. 4. The ends of the sleeve are bent toward the axis, and the coils 2 are compressed between the sleeve 3 and the ends of the wires 1 in such a manner that the edge portions of the coils 2 are embedded in respective surface portions of the wires and of the sleeve, thereby locking the two wire ends to the sleeve and to each other. The broad face portions of the coils abuttingly engage the surfaces of the wires 1 and the sleeve 3 without penetrating the same.

Instead of the illustrated wire of triangular cross-section, wires of other non-circular cross section may be twisted about their longitudinal axes and thereafter wound into the helical coils 2. The use of wire having a square, polygonal, or oval cross section is specifically contemplated. It is a common feature of such coils that they have alternating relatively narrow edge portions and relatively wide face portions, that only the narrow edge portions penetrate the metallic members to be joined and the surrounding sleeve, and that significant weakening of the joined ends and of the sleeve by deformation is avoided.

In a specific example of the invention, the wires to be joined were zinc plated steel wires of 5 mm. diameter. The sleeve was 48 mm. long and had outer and inner diameters of 10 and 6.2 millimeters respectively. It consisted of stainless steel (0.07% C, 1.65% Mn, 0.42% Si, 9.34% Ni, 19.09% Cr). The locking coils were made from a twisted steel wire whose cross section was a regular triangle having 0.58 mm. sides (0.62% C, 0.51% Mn, 0.27% Si).

The sleeve was hardened by heating to 1070° C. for three minutes, followed by water quenching, and the wound coils were heated to 790° C. for one minute and quenched in water. The pre-assembled components were passed between rolls as described above, until the Vickers hardness (500 g. load) of the sleeve was increased from about 190 to about 390, its length reduced to 40.2 mm., and its outer diameter to 9.2 mm. The hardness of the locking coils was 850.

When twenty such joint assemblies were subjected to tension tests, failure occurred in all cases in portions of the zinc plated steel wire outside the sleeves. No failure occurred in a joint proper.

Various modifications and variations of the illustrated embodiment of the invention may be resorted to by those skilled in the art without departing from the spirit and scope of the invention as defined in the appended claims.

What is claimed is:

1. In a joint between two ends of elongated metallic members having a sleeve covering the two ends and locking means abuttingly interposed between the metallic members and the sleeve, the improvement in the locking means which comprises:
    (a) a substantially helical coil having an axis and consisting of wire having a non-circular cross section so as to have narrow longitudinal edges,
    (b) said wire having a longitudinal axis extending in a helix about the axis of said coil and each edge extending substantially in a helix about said axis of the wire,
    (c) the outer face of the coil being defined by spaced portions of said edges, said edge portions engaging one of said ends and said sleeve.
2. In a joint as set forth in claim 1, said edges each extending in a continuous helix about said axis of the wire, and said edge portions penetrating into respective surface portions of one of said ends and of said sleeve.
3. In a joint as set forth in claim 1, said cross section being triangular.
4. In a joint as set forth in claim 1, said cross section being angular.
5. In a joint as set forth in claim 1, said wire and said sleeve being of metallic material.
6. In a joint as set forth in claim 1, another coil substantially identical with said first mentioned coil, the edge portions of said other coil engaging the other one of said ends and said sleeve.

References Cited

UNITED STATES PATENTS

| | | | |
|---|---|---|---|
| 1,036,813 | 8/1912 | Edsall et al. | 287—109 |
| 2,490,809 | 12/1949 | Holke | 287—109 |
| 2,804,320 | 8/1957 | Pearson | 287—392 |

CARL W. TOMLIN, *Primary Examiner.*

WAYNE L. SHEDD, *Assistant Examiner.*